United States Patent [19]

Höfer et al.

[11] Patent Number: 5,069,542
[45] Date of Patent: Dec. 3, 1991

[54] CONTACT LENS

[75] Inventors: Peter Höfer, Aschaffenburg; Ulrich Müller, Johannesberg; Manfred Bärenz, Dreieich; Horst Schäfer, Aschaffenburg-Obernau; Wolfgang Müller-Lierheim, Aschaffenburg, all of Fed. Rep. of Germany

[73] Assignee: Titmus Eurocon Kontaktlinsen GmbH & Co. KG., Aschaffenburg, Fed. Rep. of Germany

[21] Appl. No.: 186,674

[22] Filed: Apr. 21, 1988

Related U.S. Application Data

[63] Continuation of Ser. No. 187,905, Sep. 17, 1980, abandoned.

[30] Foreign Application Priority Data

Jan. 25, 1980 [DE] Fed. Rep. of Germany ....... 3002664

[51] Int. Cl.$^5$ ............................................. G02C 7/04
[52] U.S. Cl. .............................. 351/160 H; 351/177
[58] Field of Search ............... 351/160 R, 160 H, 161, 351/162, 177

[56] References Cited

U.S. PATENT DOCUMENTS

| 3,187,338 | 6/1965 | Neefe | 351/160 R |
| 3,227,507 | 1/1966 | Feinbloom | 351/160 R |
| 3,482,906 | 12/1969 | Volk | 351/160 R |
| 3,950,082 | 4/1976 | Volk | 351/169 |
| 4,165,158 | 8/1979 | Travnicak | 351/160 H |
| 4,180,308 | 12/1979 | Mancini et al. | 351/160 H |

Primary Examiner—Bruce Y. Arnold
Assistant Examiner—Scott J. Sugarman
Attorney, Agent, or Firm—Felfe & Lynch

[57] ABSTRACT

A contact lens has an elliptical inside surface with a numerical eccentricity of 0.2 to 0.5 and a zenith radius of curvature of 8.0 to 8.4 mm. The inside surface preferably has a peripheral, circularly cross sectioned bevelled zone. As a soft contact lens, it has these dimensions when fully hydrated and preferably consists of a copolymer comprising of 50% to 90% hydroxyethylmethacrylate (HEMA) by weight, 2% to 20% one or more unsaturated carboxylic acids, 2% to 20% one or more base monomers, 5% to 25% aliphatic acrylate or methacrylate, and 0.1% to 1% of a dialkylene-glycol-dimethacrylate cross-linker.

10 Claims, 1 Drawing Sheet

CONTACT LENS

This is a continuation of application Ser. No. 187,905 filed on Sept. 17, 1980 now abandonded.

BACKGROUND OF THE INVENTION

It is known that the inside surface of a contact lens, i.e., the surface which lies on the cornea, must be aspherical, more specifically, elliptical, in order to adapt to the surface of the human cornea ("The Contact Lens" 9th year of publication, Volume 3, 1974, pages 211 to 217).

Despite intensive research, a contact lens has still not been developed with a single internal geometry suitable for the majority of wearers and having a relatively wide vertex refractive range.

SUMMARY OF THE INVENTION

The purpose of the present invention, therefore, is to develop a geometry for the inside surface of a lens, and in particular a soft lens, which will obviate the necessity of fitting lenses for a relatively wide vertex refractive range, more specifically, from −7 to +5 diopters.

The problem has been solved by the present invention in the following way: an elliptical inside surface of the lens (a soft lens being in the fully hydrated state) has a numerical eccentricity of 0.2 to 0.5, and a zenith radius of curvature of 8.0 to 8.4 mm.

With this single internal geometry, wherein the lens has an eccentricity of 0.3 to 0.4, and more specifically 0.36, and a zenith radius of curvature of 8.2 mm., only 49 lenses are required for a vertex refractive range of −7 to +5 diopters, graded in ¼ diopters.

Over this vertex refractive range, it is no longer necessary to fit the lenses by selecting the best internal geometry, at least in the case of contact lens wearers with central corneal radii of 7.3 to 8.3 mm., and a visible iris diameter of 10.8 to 12.4 mm. It is sufficient to determine the refraction and to inspect the anterior eye sections, before inserting the lens, which is equivalent to the best spherical lens, taking into account the altered corneal zenith distance.

All that is then required is to check that the lens adheres satisfactorily, after ½ to 2 hours, and possibly to modify the correction.

A further purpose is to ensure that the lens lies flat against the central cornea. For this, the elliptical inside surface runs into a peripheral bevelled zone with a circular cross section, a width which is 0.5% to 4% of the total lens diameter, and when the lens is placed horizontally, and edge tangent which meets a vertical line constructed through the lens edge at a right angle. This improves the mobility of the lens, particularly when the wearer moves his eyes or blinks. The bevelled zone with the measurements cited prevents the lens edge from "burrowing" into the eye should the lens slip from a steeper part of the eye to a flatter part because the bevelled zone with this exact form causes the formation of a meniscus of lacrimal fluid, which controls lens movement. It is essential that the elliptical base curve of the inside lens surface continue uninterruptedly into the bevelled zone of circular section and opposite curvature. Thus the lens has good mobility and is always satisfactorily centered.

The geometry of the present invention is applicable to hard and soft contact lenses. Examples of hard lenses are the poly (methyl methacrylate) lenses, the CAB and the so-called "hard" silicone lenses. The present invention is also and in particular applicable to soft contact lenses such as those made from hydroxyethyl-methacrylate (HEMA), silicone rubber lenses and the like. In addition, the invention is most particularly applicable to soft contact lenses comprising the copolymers described hereinafter.

The most suitable material for the soft contact lens described above, is the copolymer consisting of 50% to 90% hydroxyethyl-methacrylate (HEMA) by weight, 2% to 20% or more unsaturated carboxylic acids, 2% to 20% one or more base monomers, 5% to 25% aliphatic methacrylate and 0.1 to 1% dimethacrylate polymerizer of the homologous series starting with diethylene-glycol-dimethacrylate. This copolymer can, however, also be used for contact lenses with a different geometry. The five-component copolymer described has an extremely high tensile strength, ensures a uniform degree of expansion over the entire lens body, and permits a water content of 40% to 90% (preferably 60%), depending on the proportion of other components.

HEMA, the main component of the copolymer, permits only a relatively low water content of approximately 40%. In order to increase the water content, the copolymer contains an unsaturated carboxylic acid such as acrylic acid or methacrylic acid, which, however, displaces the isoelective point into the acid range. This can encourage the build-up of undesirable proteinaceous deposits. Its action is therefore compensated by addition of a base monomer such as acrylamide, methacylamide, N-vinyl pyrrolidone or N-vinyl-δ-lactam. A copolymer consisting of these three components permits an increased water content, but has low tensile and tear strength. Addition of an aliphatic methacrylate, such as an aliphatic ester of the acrylic acid or methacrylic acid, increases tear strength, but the material then exhibits an unacceptably high degree of expansion (swelling). This can be inhibited by the cross-linking agent. The cross-linker mentioned above, and in particular dimethylacrylate of the homologous series starting with diethylene-glycol-dimethacrylate, which moreover cross-link elastically, so that when the lens is hydrated, stresses in the lens material are avoided while tear strength is maintained. Thus in combination, the properties of the five components of the copolymer complement each other.

In a preferred embodiment, the center thickness of the fully hydrated lens is 0.04 to 0.30 mm, more specifically 0.06 to 0.25 mm and the final diameter of the fully hydrated lens is 12.5 to 13.5 mm.

BRIEF DESCRIPTION OF THE DRAWINGS:

The enclosed figures give a diagrammatic representation of an embodiment of the invention to illustrate the invention in more detail. In the drawings.

DETAILED DESCRIPTION OF THE INVENTION

Figure 2:
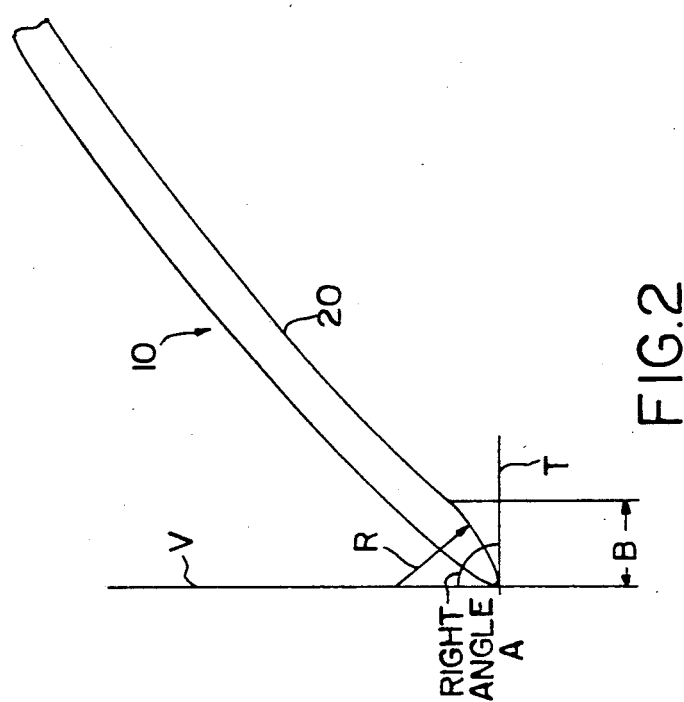
FIG. 2 is an illustration, enlarged 62.5 times, of a section of the bevelled zone of the contact lens shown in FIG. 1, in the hydrated state.
Figure 1:
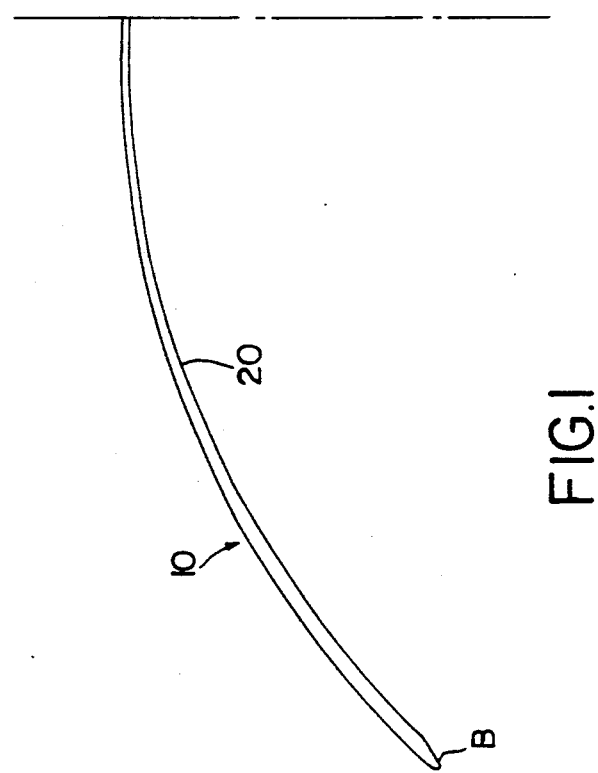
FIG. 1 is a section of one-half of a contact lens, enlarged 20 times, which represents the form of implementation of the invention in the hydrated state.

FIGS. 1 and 2 show a contact lens 1 having an elliptical inside surface 20 with an eccentricity of 0.36, a final diameter of 9.35 mm., and a peripheral bevelled zone B with a width of, for example, 0.15 mm. As shown in greater detail in FIG. 2, the elliptical curve of the inside surface 20 runs seamlessly, i.e., tangentially, into a circularly curved surface of radius R forming the bevelled zone B, and the tangent T of the bevelled zone at the outer edge of the lens meets a vertical V constructed through the outer edge at a right angle when the lens is horizontal.

The illustrated elliptical curvature of the inside surface 20, and the circular cross section of the bevelled zone B which meet seamlessly, or at a tangent, can be cut by means of an elliptical and circular tool, such as a diamond, when the lens is in the dehydrated state, i.e., when it is rigid. The standard procedure is followed: the lens is polished, cleaned and hydrated, by means of, for example, physiological saline solution, and finally checked for optical parameters. The finished lens can then be stored in, for example, physiological saline solution, and autoclaved.

An example of implementation of the invention is cited below.

In the non-hydrated state, the lens has a diameter of 9.19 mm, and a bevel width of 0.15 mm. The numerical eccentricity of the elliptical inside surface is 0.36. The contact lens material consists of a copolymer, with the following composition:

| HEMA | 77.8% by weight |
|---|---|
| Vinyl pyrrolidone | 3.4% by weight |
| Methacrylic acid | 5.2% by weight |
| Butyl-methacrylate | 12.9% by weight |
| Triethylene-glycol-dimethacrylate | 0.7% by weight |

The water content of the hydrated contact lens is 59%±1% by weight.

Another suitable contact lens material is produced by Duragel Limited, under the trade name DW 1 (Data Sheet DW 1 from the firm Duragel Limited, Meopham Trading Estate, Meopham, Gravesend, Kent DA 13 0LT). This material has a water content of 60.0%. It also permits the production of lenses with an elliptical inside surface having an eccentricity of 0.36, a final diameter of 9.35, and a bevel width of 0.15 mm in the non-hydrated state.

It will be understood that the specification and examples are illustrative but not limitative of the present invention and that other embodiments within the spirit and scope of the invention will suggest themselves to those skilled in the art.

What is claimed is:

1. A contact lens comprising:
    a contact lens member,
    means comprising an elliptical inside surface on the lens member for fitting an eye,
    the elliptical inside surface having a numerical eccentricity of from 0.2 to less than 0.4, and a zenith radius of curvature of from 0.8 to 8.4 mm, and
    a bevelled zone peripheral of the elliptical inside surface having a circular cross section of radius (R), a width (B) which is 0.5% to 4.0% of the total lens member diameter, and a seamless, tangential junction with the elliptical inside surface.

2. The contact lens according to claim 1, wherein the lens has an eccentricity of 0.3 to less than 0.4 and a zenith radius of the curvature 8.2 mm.

3. The contact lens according to claim 2, wherein the eccentricity is 0.36.

4. The contact lens according to claim 1, wherein the center thickness of the lens is 0.04 to 0.30 mm.

5. The contact lens according to claim 4, wherein the center thickness is 0.06 to 0.25 mm.

6. The contact lens according to claim 1, wherein the diameter of the lens is 12.5 to 13.5 mm.

7. The contact lens according to claim 1, wherein, when the lens is placed horizontally, the tangent (J) of the cross section of the bevelled zone meets a vertical line (V) constructed through the lens member edge at a right angle (A).

8. The contact lens according to claim 1, wherein the lens member is made from a hydratable, soft lens material and the eccentricity and the zenith radius of curvature are for a fully hydrated lens.

9. The contact lens according to claim 8, wherein the center thickness when fully hydrated is 0.04 to 0.30 mm and the final diameter when fully hydrated is 12.5 to 13.5 mm.

10. A method of fitting contact lenses to the majority of wearers, comprising:
    shaping the inside surface of each lens member with the same geometry for fitting the majority of wearers,
    the lens members having appropriate refraction in a relatively wide refractive range, and
    the geometry of the inside surface of each lens member being elliptical with a numerical eccentricity of from 0.2 to 0.5 and a zenith radius of curvature of from 8.0 to 8.4 mm and having a peripheral bevelled zone on the elliptical inside surface of each lens member having a circular cross section, a width which is 0.5% to 4.0% of the total lens member diameter, and a seamless, tangential junction with the elliptical inside surface.

* * * * *

UNITED STATES PATENT AND TRADEMARK OFFICE
CERTIFICATE OF CORRECTION

PATENT NO. : 5,069,542
DATED : December 3, 1991
INVENTOR(S) : Peter Hofer, et al.

It is certified that error appears in the above-identified patent and that said Letters Patent is hereby corrected as shown below:

Column 4, line 27, Claim 7, "the tangent (J)" should read --the tangent (T)--.

Signed and Sealed this

Thirteenth Day of July, 1993

Attest:

MICHAEL K. KIRK

Attesting Officer

Acting Commissioner of Patents and Trademarks